March 29, 1960 M. R. MULFORD 2,930,162
SHIPPING AND GROWING DEVICE FOR BULBS
Filed Sept. 30, 1957 2 Sheets-Sheet 1

INVENTOR.
MARION R. MULFORD,
BY
ATTORNEYS.

March 29, 1960 M. R. MULFORD 2,930,162
SHIPPING AND GROWING DEVICE FOR BULBS
Filed Sept. 30, 1957 2 Sheets-Sheet 2
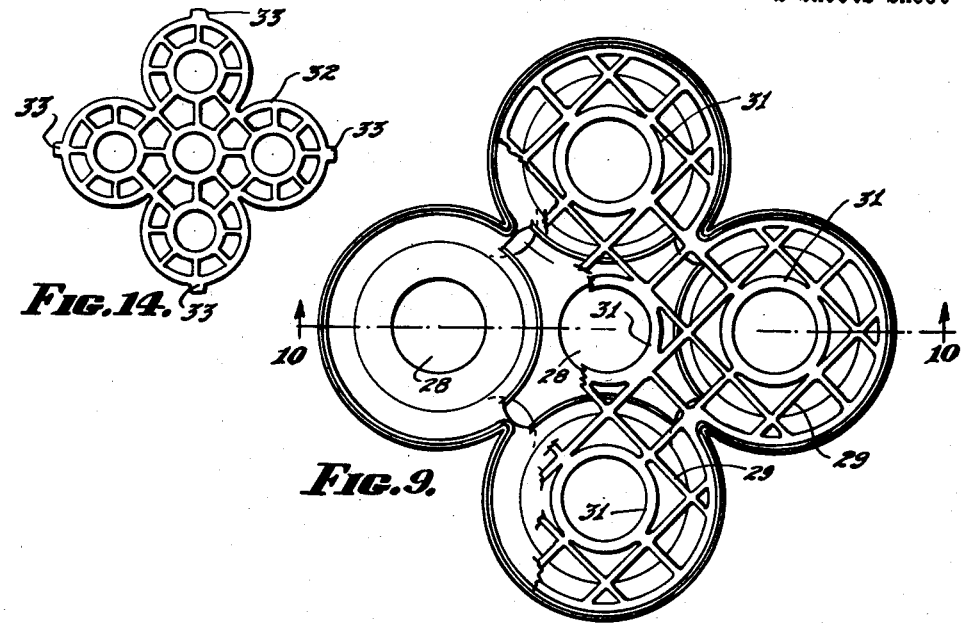
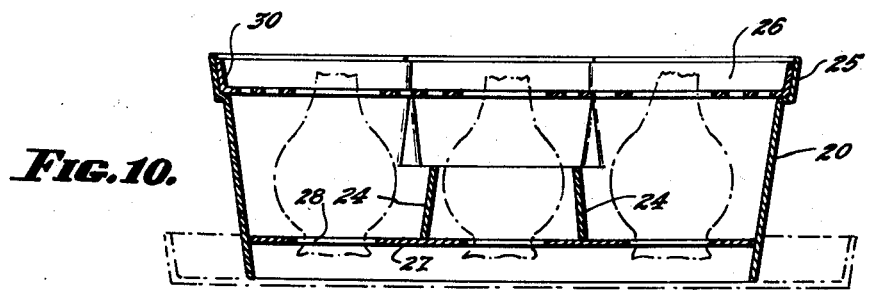
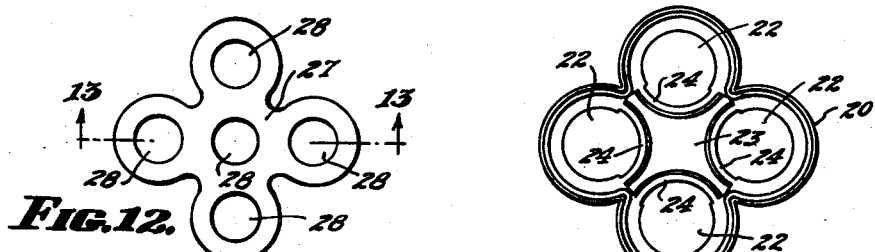
INVENTOR.
MARION R. MULFORD,
BY
ATTORNEYS.

United States Patent Office 2,930,162
Patented Mar. 29, 1960

2,930,162
SHIPPING AND GROWING DEVICE FOR BULBS

Marion R. Mulford, Lebanon, Ohio, assignor to Mulford Brothers Company, Lebanon, Ohio, a partnership Application September 30, 1957, Serial No. 687,004

6 Claims. (Cl. 47—37)

This invention relates to a shipping and growing device for bulbs. The invention may be realized in the form of a package in which one or more bulbs are packed and in which package the bulbs may be grown by the addition of water. It may also be realized in the form of a package within which bulbs may be packed and which package in its entirety may be planted in the ground for the growing of the bulbs out of doors.

In any package for the growing of bulbs it is desirable to provide means whereby the bulbs are held in position for growing neck up. It is accordingly an object of the present invention to provide a package arranged to support one or more bulbs in erect position for growing. It is another object of the invention to provide a device as outlined which will hold the bulbs with sufficient security that they will not be disarranged in shipment.

Still another object of the invention is to provide a device as above outlined which will be attractive in appearance and relatively inexpensive to manufacture.

These and other objects of the invention which will be pointed out in more detail hereinafter or which will be apparent to one skilled in the art upon reading these specifications, I accomplish by that certain construction and arrangement of parts of which I shall now describe certain exemplary embodiments.

Reference is made to the drawings forming a part hereof and in which:

Figure 9 is a plan view of a modified device according to the invention.

Figure 10 is a cross-sectional view of the same on the line 10—10 of Figure 9.

Figure 11 is a view similar to Figure 9 but without the top and bottom members and on a smaller scale.

Figure 12 is a plan view of the bottom member.

Figure 13 is an elevational view of Figure 12 showing how the bottom member is placed in position.

Figure 14 is a plan view of a modified top member; and

Figure 15 is a fragmentary elevational view showing the top member of Figure 14 placed in position.

Briefly, in the practice of my invention I provide a container element and a cover element. The container element is provided with positioning means for the base of one or more bulbs and the cover element is provided with positioning means for the neck of one or more bulbs.

It is to be understood that throughout the present specification and claims the term "container" is used in the sense of an element into which something may be placed, whether it has solid walls or foraminous or openwork or mesh walls. The reason for this is that in one aspect of the invention the container and cover elements are of solid material which may or may not be transparent so that the device may be placed upon a table or a window sill in the house and the bulbs may be grown by the addition of water to the device, as will be described hereinafter.

In another aspect of the invention, however, the device is of mesh or openwork or foraminous material and is intended to be placed into the ground for the growing of bulbs out of doors. In this latter case, the root elements may pass out through the meshwork or openwork and earth and water may enter therethrough.

Referring now in more detail to the drawings, the device may be of trefoil shape in horizontal cross-section as seen in Figures 1 to 7 inclusive. The particular embodiment illustrated is of trefoil shape and is designed for the shipment and growing of three bulbs. In Figures 8 to 15 inclusive I have shown a modification where the device is designed for four bulbs. It will be clear that the device may be of any desired shape and provide for the growing and shipment of any desired number of bulbs.

A container element is indicated generally at 10. In the particular embodiment illustrated it is of solid material and it is intended that the bulbs shall be grown in the house and that the container shall be capable of holding water. It will be clear, however, that the container may be perforated or made of any desirable openwork or open mesh material.

For the attractive display of bulbs and the growing of bulbs in the house, the material of the container element 10 and also of the cover element 11 is preferably a clear plastic material so that the root development may be observed, and the water level inspected. The specific material does not constitute a part of the present invention and any material may be used which will not be deleteriously affected by water or chemicals found in soil.

Figure 3:
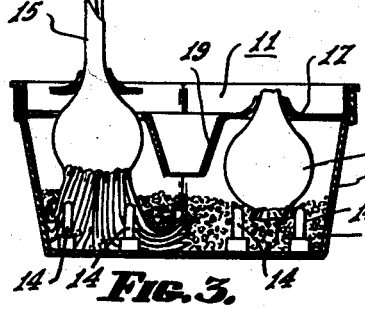
Figure 3 is a cross-sectional view of the same taken on the line 3—3 of Figure 1.
Figure 4:
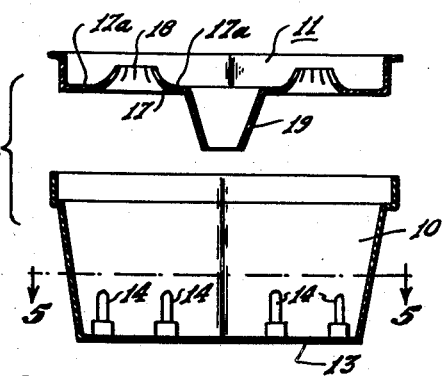
Figure 4 is a view similar to Figure 3 but exploded to show the cover separated from the container.
Figure 5:
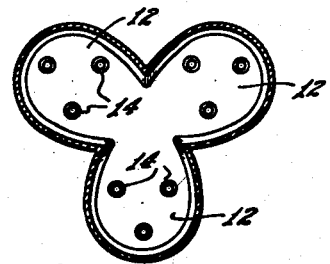
Figure 5 is a cross-sectional view taken on the line 5—5 of Figure 4.

As best seen in Figures 3, 4, and 5 the container element 10 provides three communicating compartments 12, each of which is of a size to contain a single bulb. Extending upwardly from the bottom 13 of the element 10 are positioning elements for the base of a bulb. In the embodiment shown, these positioning elements are in the nature of studs or pins 14 which may be either rigid or flexible, and as seen in Figure 5 these studs 14 are disposed symmetrically on a circle of a diameter smaller than the diameter of the bulb which they are to support. The studs 14 are recessed on their underside, or are hollow, to permit close stacking of empty containers. Thus, as seen in Figure 3, each of the bulbs 15 rests upon three studs 14 which thus position the base of the bulb and hold it above the bottom of the container 10. It will be understood that while I have shown three such studs 14 for each bulb, the number of studs is unimportant and it is not even important that the positioning means be in the form of studs. It will be understood that the conical, rounded shape of the compartments 12 assist in holding the bulbs in position.

The cover element 11 as shown in Figures 3 and 4 is arranged to be press fitted onto the container element 10 and the cover element 11 is provided with positioning means for the neck of the bulb. These positioning means in the embodiment illustrated comprise apertures 16 having the upwardly flared and tapering edges 17 which may, if desired, be slit as at 18. From a consideration of Figure 3, it will be clear that when a bulb is supported on the supporting elements 14 and the cover 11 is placed in position, the members 17 serve to position the necks of the bulbs 15 so that in the complete packaging the bulbs are securely held in position for growing and protected against accidental disarrangement. By virtue of the construction of the members 17, loading of the container is facilitated, and the slits make it possible for these members to spring outwardly to accommodate bulbs of different sizes.

As the bulbs develop root systems, the roots fill up the bottom of the container, and as they continue to grow they tend to force the cover off by pushing the bulbs upwardly. Preferably the cover will be sealed or otherwise secured to the container, and lines of perforation 17a are provided. Thus, as the roots develop and the bulbs are forced upwardly, the circular portions defined by the lines of perforation or weakness 17a will be broken out, permitting upward movement of the bulbs.

For growing in the house, the cover element 11 is provided with the downwardly extending funnel element 19 which serves as a watering opening, and also helps to hold the bulbs in position. The bottom of the cover element is recessed below the edge thereof to facilitate watering.

Figure 6:
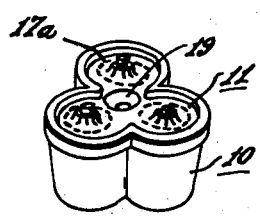
Figure 6 is a perspective view of the complete device.
Figure 7:
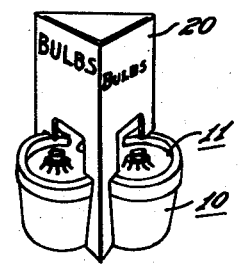
Figure 7 is a view similar to Figure 6 illustrating a display device which may be used in connection therewith.

A complete package is shown in perspective in Figure 6 and as shown in Figure 7 a display element 20 made of paperboard or the like may be attached to the package to carry advertising messages, growing instructions and the like. It will be understood that the element 20 will be removed after purchase of the package. The tapered and rounded configuration of the package lends itself well to the addition of the display element or protective cover 20, which is positioned on the package by slightly spreading its legs, which then spring back into locking position as shown in Figure 7.

Figure 1:
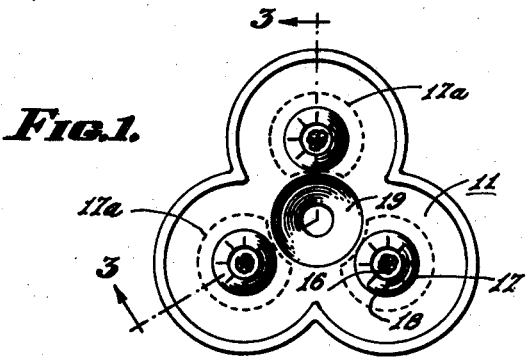
Figure 1 is a plan view of an exemplary device according to the present invention.
Figure 8:
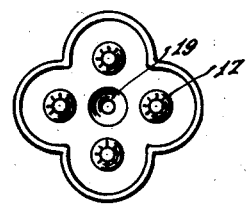
Figure 8 is a view similar to Figure 1 on a reduced scale showing a modification.
Figure 2:
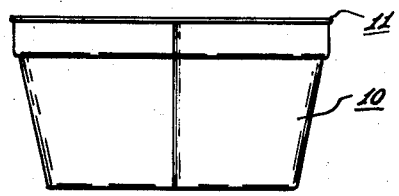
Figure 2 is an elevational view of the same.

The device of Figure 8 differs from that of Figures 1 to 7 only in that the package is quatrefoil in cross-section rather than trefoil, but it is provided with the same watering opening 19 and the same positioning means 17 and 14.

If it is desired to provide a package for bulbs to be planted out of doors, it is only necessary that the container element and cover element be of openwork material or be perforated or otherwise arranged to provide access for earth and water and to permit the roots to pass out during growing. It is because of the fact that the basic invention may be utilized in the two ways above described that I have used the term "container" not in the sense of something which will hold water but in the broader sense of something within which a bulb may be placed, whether it will hold water or not.

While for growing bulbs in the home indoors no earth is used but only water, it may be desirable to place within the container a quantity of brightly colored fragmentary material indicated generally at 21. This may be gravel or plastic chips, marble chips or the like. This material is only for the visual effect. In growing the bulbs in the house, water is poured through the funnel element 19 so that it just touches the bottoms of the bulbs, or so that the water level is slightly below the bottoms of the bulbs.

In Figures 9 to 15 inclusive I have shown a device according to the invention in an embodiment particularly designed for planting of bulbs out of doors and I have shown this embodiment in the modification of Figure 8 wherein the package is of quatrefoil shape. In this particular embodiment, the package is adapted for the planting of five bulbs, one in each of the four compartments and one in the center. In these figures the main body of the package is indicated at 20 and is of the quatrefoil appearance best seen in Figures 9 and 11. While this body may be of foraminous or mesh material, it need not be so constituted since in this embodiment the bottom member is perforated and the top member is of open mesh construction so that water and earth may enter into the package and the roots of the bulbs may issue from the package.

The member 20 is perhaps best seen in Figure 11 where it is shown without the bottom member or top member in position. It is of quatrefoil shape and each of the compartments 22 is frusto-conical, tapering inwardly toward the bottom. Because it is desired to place a fifth bulb in the central compartment which has been designated 23, each of the compartments 22 is partially defined by a wall of partial height indicated at 24. It will be seen that the four elements 24 define the central compartment 23. At its upper edge, the member 20 is provided with the offset portion 25 to receive the cover element 26 in the same manner as in the embodiment of Figures 1 to 8 inclusive.

The bottom member is shown in Figure 12 and is indicated at 27. As there seen it is shaped to conform to the shape of the member 20 and is provided with the holes 28. The holes 28 constitute the positioning elements for the bottoms of the bulbs in that, as best seen in Figure 10, the bottoms of the bulb project out through the holes 28 and are thereby positioned. The member 27 is placed in the package by distorting opposed leaves of the quatrefoil, as shown in broken lines in Figure 13. These will of course flex back into a single plane when the device is assembled. The member 27 is prevented from upward movement by the members 24, heretofore described, and it is held against downward movement by the taper of the walls 20.

The top member of Figures 9 and 10 is of openwork or open mesh material as clearly seen in Figure 9 and indicated at 29, and is provided with the annular upwardly extending flange 30 to engage in the portion 25, as best seen in Figure 10. Centrally of each compartment 22 the open mesh top is provided with the circular elements 31 which serve to position the necks of the bulbs in the same manner as the elements 17 of Figure 1 to 17 inclusive.

In Figure 14 I have shown a modified top member which is all in a single plane as indicated at 32 and which is provided with the locking tabs 33. In this case the member 20 will be provided with apertures 34 through which the tabs 33 may extend and the member 32 is placed in position by flexing it as seen in Figure 15, so that when it is released it will occupy the broken line position shown in Figure 15.

It will be clear that the construction shown in Figures 9 to 15 inclusive may be applied to the trefoil form of package of Figures 1 to 7 inclusive, just as the construction of the package of Figures 1 to 7 may be adapted to a quatrefoil design.

It will be understood that numerous variations may be made in the shape of the container and cover and with respect to the number of bulbs to be packed therein and with respect to the materials of which the device is made. I do not, therefore, intend to limit myself otherwise than as set forth in the claims which follow.

Having now fully described my invention, what I claim as new and desire to secure by Letters Patent is:

1. A shipping and growing device for bulbs consisting essentially of a container element of multifoil shape in horizontal cross-section defining a plurality of communicating compartments each of a size to contain a bulb, said container having a bottom member of corresponding multifoil shape with a positioning means in each of said compartments for the base of a bulb placed therein, and a separate cover element, adapted to be press fitted on said container element, said cover element being of corresponding multifoil shape, and having an aperture therein for the neck of a bulb placed in each of said compartments, said container element and cover element being of water impervious material, said cover element having a watering aperture centrally disposed therein, said watering aperture being in the form of a downwardly projecting funnel-like member the sides of which serve to partially separate said compartments, said container bottom and said cover element coacting to hold the bulbs securely in said compartments.

2. A device according to claim 1, wherein the positioning means for the base of a bulb comprises at least three elements extending upwardly from the bottom of said container element and symmetrically disposed on a circle of smaller diameter than the said bulb.

3. A device according to claim 1 wherein the apertures in said cover element each have an upwardly flared edge, and wherein each of said apertures is surrounded by an annular line of weakness spaced outwardly therefrom, whereby portions of said cover element may be broken away as the bulbs grow.

4. A shipping and growing device for bulbs, comprising a container element of trefoil shape in horizontal cross-section defining three communicating bulb receiving compartments, positioning means for the base of a bulb in each of said compartments, a press-fitted cover element for said container, said cover element being also of trefoil shape and having in the area covering each of said compartments positioning means for the neck of a bulb, said device, when said cover element is in position, holding said bulbs securely in erect position for growing, said container element and cover element being of transparent plastic material, and said cover element having a downwardly extending central watering opening, the sides of which serve in part to separate said compartments.

5. A device according to claim 4, wherein the positioning means for the base of each bulb comprises at least three elements extending upwardly from the bottom of said container element and symmetrically disposed on a circle of smaller diameter than the said bulb.

6. In a shipping and growing device for bulbs, a container element of trefoil shape in horizontal cross-section defining three communicating bulb receiving compartments, said container element having a bottom wall mounting positioning means for the base of a bulb in each of said compartments, said positioning means each comprising at least three upwardly projecting pins symmetrically disposed on said bototm wall and spaced so as to receive the base of a bulb, a separate cover element adapted to be press-fitted on said container element, said cover element also being of trefoil shape and having in the area covering each of said compartments an aperture with an upwardly flaring edge, and a centrally disposed funnel-like watering opening projecting downwardly from said cover element, the sides of said funnel-like water opening serving to partially separate said compartments.

References Cited in the file of this patent

UNITED STATES PATENTS

| | | |
|---|---|---|
| 1,959,510 | Van Waveren | May 22, 1934 |
| 2,238,818 | Mulford | Apr. 5, 1941 |
| 2,720,725 | Peerless | Oct. 18, 1955 |
| 2,814,910 | Reparon | Dec. 3, 1957 |